3,784,664
MOULDING PROCESS
Norman Brian Nicklin, Halesowen, England, assignor to British Industrial Plastics Limited, Manchester, England
No Drawing. Continuation-in-part of abandoned application Ser. No. 20,407, Mar. 17, 1970. This application Apr. 13, 1972, Ser. No. 243,833
Claims priority, application Great Britain, Mar. 24, 1969, 15,311/69
Int. Cl. B29c 9/00
U.S. Cl. 264—246                   10 Claims

ABSTRACT OF THE DISCLOSURE

A method of producing decorated thermoset polyester mouldings by a two-step process, wherein the first step comprises shaping, in a mould and under heat and low pressure, a thermosetting unsaturated polyester moulding composition, preferably a nil or low-shrinkage type, having applied thereto an unimpregnated decoration sheet of paper-like material whereby the decoration sheet is partly impregnated with polyester resin from the moulding composition and the moulding composition is at least partially cured so that the decoration sheet adheres to the surface of the moulding, and wherein the second step comprises applying thermosetting resinous material to the surface of the decoration sheet and reapplying heat and pressure to cause the resinous material to flow over the surface, complete impregnation of the decoration sheet and cure, and to complete curing of the moulding composition; the thermosetting resinous material preferably is a polyester resin or a surface finishing material such as melamine-formaldehyde resin.

---

This application is a continuation-in-part of my U.S. application, Ser. No. 20,407 filed Mar. 17, 1970 and now abandoned.

This invention relates to the production of decorated articles and especially to a process for producing thermosetting mouldings having decorative surfaces.

The application of decorative material to articles moulded from thermosetting synthetic resin moulding compositions, for example urea-formaldehyde or melamine-formaldehyde compositions, is commonly effected by applying to the part-cured article a sheet of paper, or similar material, bearing the decoration, and which is impregnated with a suitable thermosetting resin, and then bonding the impregnated sheet to the base, with simultaneous cure of the resin with which the sheet is impregnated, by application of heat and pressure.

Impregnated sheets used in this fashion are generally referred to as "foils."

It has also been suggested to apply a pattern to the surface of a moulded article by shaping and part-curing the article in a press, opening the press before the thermosetting synthetic resin of which the article is constituted has fully cured, applying an ordinary (i.e. not impregnated) printed sheet of paper to the surface of the part-cured moulding, closing the press for a time sufficient to bond the paper to the article and to allow the paper to sink slightly into the surface of the article, opening the press and applying a layer of suitable thermosetting synthetic resin in powder form, and then closing the press and applying heat and pressure yet again to bring about penetration of the paper by, and cure of, the powder. This process is more complicated than that described earlier but has the advantage that cheap unimpregnated decoration-bearing foils can be used.

We have now devised a simple and effective method of producing decorated articles. The method of the present invention comprises forming into shape and partially curing unsaturated polyester resin-containing moulding material having applied thereto an unimpregnated decoration-bearing paper or similar material whereby the paper-like material is partially impregnated and then applying thermosetting resinous material to the surface of the decoration-bearing material, and applying heat and pressure to the partially cured material and the decoration-bearing material to complete the cure of the partially cured material, cause the thermosetting resinous material to flow over the surface of the decoration-bearing material and complete its impregnation and cause said thermosetting resinous material to cure.

The term "paper or similar material" is intended to embrace other fabrics which may be used, for example textile materials such as rayon fabrics. The material should be suitably absorptive so that the resin can penetrate. Normal alpha-cellulose paper of 40 g./sq. m. weight is suitable.

The term "decoration" is intended to include any coloring, lettering, design or pattern, whether it is purely decorative or merely utilitarian. Thus the decoration-bearing material may, in some cases, be simply an un-patterned sheet, which is decorative by virtue of its color, although usually the sheets will bear a printed pattern on one side or the other. In the latter case, the decorative side is generally placed outermost in the practice of the present invention.

The type of ink used to print a pattern is not critical but a low oil or oil-free type may be advantageous in reducing running which might occur with resin flow over it.

The invention is particularly useful for the manufacture of decorated articles from resins which can be moulded with comparatively low pressures. Suitable among such materials are unsaturated polyester resin dough moulding compositions and sheet moulding compositions. The essential components of such materials are an unsaturated polyester resin, a mineral filler, reinforcing fibres, catalysts, inhibitors (when long storage life is required), lubricants and pigments. The resin, filler and reinforcing fibres are the main ingredients, the resin itself is, of course, the most important ingredient, and suitably it is provided in admixture with a copolymerizable monomer. A typical copolymerizable monomer is styrene or diallyl phthalate, and a typical polyester resin (such are very well known in the art) is a propylene glycol/maleate/phthalate resin. Mineral fillers, which are included in the dough moulding composition in fine powder form, include calcium carbonate, kaolin, talc and mica. The fibrous reinforcement, which may be asbestos fibres, preferably comprises glass fibres.

The dough moulding composition may suitably be one of those described in our U.K. patent specification 936,351, the composition containing, in addition to the ingredients specified above, a relatively small proportion of thermoplastic polymeric material such as polystyrene.

Further, it is preferred to use a low-shrinkage or nil-shrinkage dough moulding composition, in order that, when the moulding tool is opened, after partial curing of the moulding material, to allow the thermosetting resin to be applied to the surface of the decoration bearing material, little or no change in the dimensions of the partial moulding takes place. A typical nil-shrinkage dough moulding composition comprises, in parts by weight, 25 parts of an unsaturated polyester resin made from propylene glycol, maleic anhydride and phthalic anhydride (the mole ratio glycol/maleic/phthalic being 3:2:1, and the resin being a 2:1 solution in styrene), 46 parts finely divided calcium carbonate, 8 parts polyvinyl acetate, 20 parts ¼" glass fibre, 1 part zinc stearate, 0.06 part phenolic inhibitor, catalyzed by 3% benzoyl peroxide paste (50%).

The use of resins which require low pressures for moulding is greatly to be preferred as low pressures obviate the possibility of the paper or other decoration-bearing material being torn in the process.

Suitable thermosetting resinous materials for applying to the surface of the decoration-bearing material are liquid polyester resins, which are preferably catalyzed. Aminoplast resins, for example melamine-formaldehyde resins, may also be used, and give to the final product a hard surface. Polyester resins do not give such a hard surface as is obtained by the use of melamine-formaldehyde resins, but the former are perfectly adequate for many purposes, including the production of, for example, car dash boards. A typical polyester resin for use as a surfacing resin is a propylene glycol/maleate/phthalate resin (mole ratio 3:2:1), two parts of which are dissolved in 1 part styrene.

In practice of the process of the invention the moulding material remains in the bottom part of the mould with the decoration-bearing material on top of it so that the resin to be applied to the decoration-bearing material may be poured onto the said material. If there is anything more than slight double curvature on the surface, the decoration-bearing material is advantageously preformed to prevent the possibility of formation of creases. Although with an approximately square panel, as described in the following example, the resin can be poured into a small pool in the middle and will readily flow all over, for a moulding whose length is much greater than its width (e.g. a car dash-board), the resin should be applied as a streak so that the distance of flow to the edge is approximately the same everywhere; otherwise resin may be lost as flash at the short boundary before there is time to flow to the long one. It is, of course, as mentioned above, possible to use fabric in the place of paper, although the latter will usually be cheaper and equally effective. However, a woven fabric can often be stretched without tearing, particularly if cut with the bias in a suitable direction, and this can be advantageous. Since the liquid resin impregnates the sheet readily, reasonably thick paper can be used and this is not so easily torn.

The following examples are given for the purpose of illustrating the invention.

EXAMPLE 1

The article to be moulded is a 200 x 200 x 3 mm. panel.

240 g. of nil shrinkage DMC of composition, in parts by weight, 25 parts Beetle resin 4128
46 parts finely divided calcium carbonate
8 parts polyvinyl acetate
20 parts ¼" glass fibre
1 part zinc stearate
0.06 part phenolic inhibitor
3% benzoyl peroxide paste (50%), are charged to the mould of a press and a piece of 125 g./m.² laminating base paper, slightly larger than the required area, is placed on top of the DMC slug.

The press is closed carefully with a total pressure of 20 tons so as not to cause too rapid a flow and consequent tearing of the paper.

The article is cured for a period of 1 minute at 140° C. and the press opened, by which time the paper is firmly adhered to the surface of the moulding which remains in the mould with the paper side exhibited.

The moulding is blown with compressed air to eliminate any dirt or bits of flash which may have fallen onto the surface.

25 g. of an unsaturated polyester resin (Beetle 4128) which has been previously catalyzed with ½% by weight benzoyl peroxide paste, are then poured into the center of the paper-surfaced partially-cured moulding, the press then quickly closed, and the cure of the moulding continued for a further minute, after which time the press is opened and the completely cured moulding, having a glossy "skin" covering the paper adhered to the body thereof, ejected.

When pouring on the surfacing resin, care should be taken to avoid isolated drips or streaks of resin which will cure rapidly and so mar the surface of the finished moulding.

In this technique it is preferred that the paper surface is always exhibited on the bottom part of the mould so that the resin can be poured onto it. Pouring the resin onto the hot metal causes too quick a cure and subsequent marring of the cured surface.

(Beetle resin 4128 is an unsaturated polyester resin which is a 2:1 solution in styrene of a propylene glycol/maleate/phthalate resin, the mole ratio glycol/maleate/phthalate being 3:2:1. It is sold by B.I.P. Chemicals Limited.)

EXAMPLE 2

The article to be moulded is a 200 x 200 x 3 mm. panel.

240 g. of nil shrinkage DMC (Beetle type N6X containing 5% by weight polyvinyl acetate) are charged to the mould of a press and a piece of 125 g./m.² laminating base paper is placed on top of the DMC slug.

The press is closed carefully with a total pressure of 20 tons so as not to cause too rapid a flow and consequent tearing of the paper.

The article is cured for a period of 1 minute at 140° C. and the press opened by which time the paper is firmly adhered to the surface of the moulding which remains in the mould, paper side exhibited.

The moulding is blown with compressed air to eliminate any dirt or bits of flash which may have fallen onto the surface.

25 g. of a melamine/formaldehyde spray dried resin (M/F ratio 1:2) catalyzed with 1% w./w. benzoic acid, are placed, either in the form of a dry powder or in the form of a pellet or tablet, onto the surface of the paper surfaced moulding. The press is then closed onto the M/F resin which liquifies under heat and impregnates the paper surface and the cure of the moulding continued for a further minute, after which time the press is opened and the completely cured moulding is ejected.

The finished moulding is essentially a polyester dough moulding, exhibiting a decorative surface, possessing the high gloss and scratch resistant surface of melamine.

(N6X comprises, by weight, Beetle resin 4128, 25%; ¼" glass fibre, 14%; calcium carbonate, 49.5%; polyvinyl alcohol, 10%; zinc stearate, 1.5%; and, by weight of these five ingredients, 3% benzoyl peroxide paste as catalyst and 0.06% phenolic inhibitor.)

What is claimed is:

1. A method for producing decorated articles comprising in a first step forming into shape under heat and low pressure in a mould a thermosetting, unsaturated polyester moulding composition, having applied thereto an unimpregnated decoration sheet of paper-linked material, to partly impregnate the decoration material by the resin from the polyester moulding composition and to cure the moulding composition at least up to the stage at which the paper-like material adheres to the surface of the moulding on opening the mould, and in a second step opening the mould, applying thermosetting resinous material to the surface of the decoration material and re-applying heat and pressure to cause the thermosetting resinous material first to flow over the surface and complete the impregnation of the decoration material, and then to cure the thermosetting resinous material and complete the cure of the moulding composition.

2. A method as claimed in claim 1 wherein the polyester moulding composition is a nil or low-shrinkage type.

3. A method as claimed in claim 1 wherein the thermosetting resinous material comprises a polyester resin.

4. A method as claimed in claim 3 wherein the polyester resin is catalyzed.

5. A method as claimed in claim 1 wherein the thermosetting resinous material comprises an aminoplast.

6. A method as claimed in claim 5 wherein the aminoplast is a melamine-formaldehyde resin.

7. A method as claimed in claim 3 wherein the thermosetting resinous material is applied in the form of a small pool to the center of the surface of the decoration-bearing material.

8. A method as claimed in claim 1 for the production of an article whose length is substantially greater than its width, wherein the thermosetting resinous material is applied to the surface of the decoration-bearing material in the form of a longitudinal streak parallel to and equidistant from the longer sides of said surface.

9. A method for producing decorated articles comprising in a first step placing a thermosetting unsaturated polyester moulding composition in the low part of a two-part heated mould, with an unimpregnated decorated paper-like sheet placed on the top thereof, subjecting the assembly to heat and low pressure so that the resin from the moulding composition partly impregnates the decoration material and the moulding composition is cured up to the stage at which the paper-like material adheres to the surface of the moulding on opening the mould, applying a small pool of a polyester surfacing resin to the center of the surface of the decoration-bearing material, closing the mould, and reapplying heat and pressure to cause the polyester surfacing resin first to flow over the surface and complete the impregnation of the decoration sheet, and then to cure the surfacing resin and to complete the cure of the moulding composition.

10. A method for producing decorated articles comprising in a first step placing a thermosetting unsaturated polyester moulding composition in the lower part of a two-part heated mould, with an unimpregnated decoration paper-like sheet placed on the top thereof, subjecting the assembly to heat and low pressure so that the resin from the moulding composition partly impregnates the decoration material and the moulding composition is cured up to the stage at which the paper-like material adheres to the surface of the moulding on opening the mould, applying to the surface of the decoration material a charge of a melamine-formaldehyde resin in powder or pellet form, closing the mould and reapplying heat and pressure to cause the melamine-formaldehyde resin first to flow over the surface and complete the impregnation of the decoration material, and then to cure the melamine-formaldehyde resin and complete the cure of the moulding composition.

References Cited
UNITED STATES PATENTS

| | | | |
|---|---|---|---|
| 3,562,375 | 2/1971 | Guy | 264—131 X |
| 3,184,527 | 5/1965 | Fischer | 264—257 X |
| 3,518,146 | 6/1970 | Plympton | 264—247 X |
| 2,861,911 | 11/1958 | Martin | 264—257 X |
| 3,410,943 | 11/1968 | Rosenberger | 264—255 |

FOREIGN PATENTS

| | | | |
|---|---|---|---|
| 167,676 | 1956 | Australia | 264—247 |

ROBERT F. WHITE, Primary Examiner

R. R. KUCIA, Assistant Examiner

U.S. Cl. X.R.

264—132, 255, 257